US008962497B2

(12) United States Patent
Breker

(10) Patent No.: US 8,962,497 B2
(45) Date of Patent: Feb. 24, 2015

(54) FIRE RESISTANT COMPONENT

(75) Inventor: Ronald Breker, Erkelenz (DE)

(73) Assignee: IBV Holding GmbH, Osnabrück (DE)

( * ) Notice: Subject to any disclaimer, the term of this patent is extended or adjusted under 35 U.S.C. 154(b) by 0 days.

(21) Appl. No.: 13/817,890

(22) PCT Filed: Aug. 17, 2011

(86) PCT No.: PCT/EP2011/004135
§ 371 (c)(1),
(2), (4) Date: May 5, 2013

(87) PCT Pub. No.: WO2012/022474
PCT Pub. Date: Feb. 23, 2012

(65) Prior Publication Data
US 2013/0216792 A1    Aug. 22, 2013

(30) Foreign Application Priority Data

Aug. 20, 2010   (DE) .................. 10 2010 035 037

(51) Int. Cl.
*B32B 5/26*       (2006.01)
*B32B 5/02*       (2006.01)
*A62C 2/06*       (2006.01)
*C04B 28/34*      (2006.01)
*B63B 29/02*      (2006.01)
*B63B 19/00*      (2006.01)
*E04B 1/94*       (2006.01)

(52) U.S. Cl.
CPC . *B32B 5/022* (2013.01); *A62C 2/06* (2013.01); *B32B 5/02* (2013.01); *C04B 28/34* (2013.01); *B63B 29/02* (2013.01); *B63B 2019/0007* (2013.01); *B63B 2231/40* (2013.01); *E04B 1/94* (2013.01)
USPC ........................ 442/136; 442/141; 442/381

(58) Field of Classification Search
CPC .............. B32B 5/05; B32B 5/16; B32B 7/00; B32B 5/06; B63B 29/02; B63B 2231/40; A62C 2/06; B05D 3/00; B27N 9/00; C04B 28/34; E04B 1/94; C03C 25/00
USPC ............ 423/299, 322, 323, 324, 341; 428/53, 428/70, 74, 79, 141, 142, 147, 293.4, 297.1, 428/297.4, 299.4, 300.7, 332, 338, 340, 428/704, 920, 921; 442/58, 64, 136, 141, 442/381
See application file for complete search history.

(56) References Cited

U.S. PATENT DOCUMENTS 4,569,878 A    2/1986   Barrall et al.

FOREIGN PATENT DOCUMENTS

EP    0 861 216 B2    9/1998
WO    97/19033       5/1997

OTHER PUBLICATIONS

Company brochure by SYMBION, Zonhoven, Belgium, published in 2006: vubonite Building in the Future.
Company brochure by PULTEX, Germany, published in 2008: vubonite Arbeitszettel.

*Primary Examiner* — Arti Singh-Pandey
(74) *Attorney, Agent, or Firm* — Gudrun E. Huckett

(57) ABSTRACT

The invention relates to a fire-resistant component (1) which satisfies the requirements of at least class B-15. Such components are known per se and are manufactured as insulated steel structures. In order that the component (1) can be manufactured more easily and with greater versatility in the manner of glass-fiber-reinforced plastic, it is proposed that it is manufactured with multiple layers of phosphate ceramic and also of fibers (7, 8, 9), and that a layer structure of the component (1) comprises at least one layer (4), on the surface thereof which faces towards a potential heat source, which is joined together only partially with a layer (5) arranged thereunder, i.e. remote from the heat source. The invention also relates to a process for producing such a component.

6 Claims, 1 Drawing Sheet

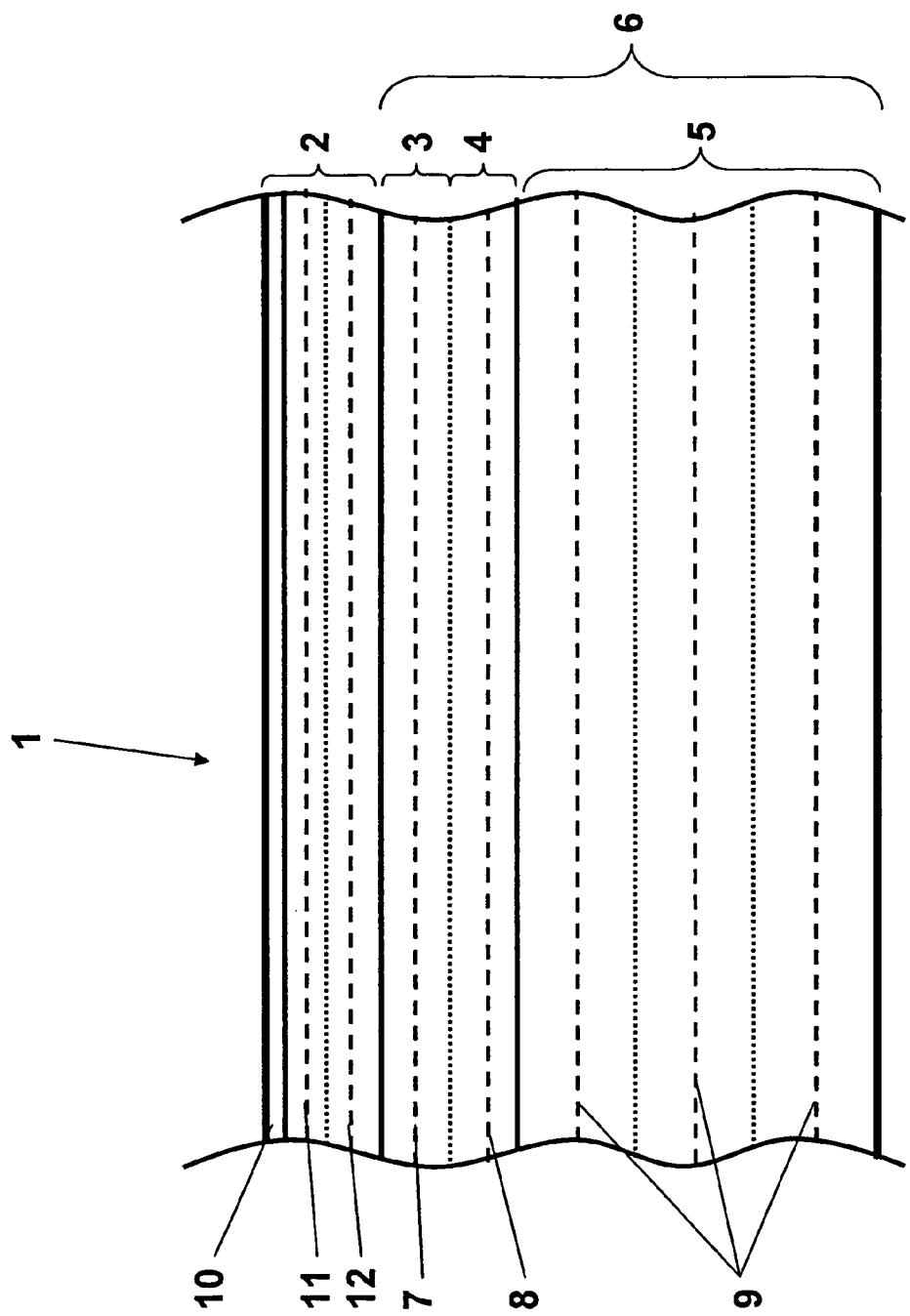

FIRE RESISTANT COMPONENT

BACKGROUND OF THE INVENTION

The invention concerns a fire-resistant component and a process for producing the component.

Such components are used e.g. on passenger ships as window frames and fire protection walls. These components must have certain properties so that they may be installed on passenger ships. This includes a fire resistance of class B-15 according to IMO FTP code, resolution A.754(18), and IMO FTP code, annex 1, part 3; it requires flame proofness, structural strength and maximum temperature under predetermined conditions at the side of the component facing away from the fire. Other components, for example, bulkhead walls, must satisfy the more stringent requirements of class B-30.

This required fire resistance, for example, of the class B-15 or B-30, has been achieved in the past only with heat-insulating steel constructions that are complex with respect to production and have a relatively high weight. Moreover, these steel constructions after installation require a paneling so that the appearance is of a pleasing design.

It is known to shape parts of reinforced organic resins, for example, glass-fiber reinforced plastic (GFRP). The resins are flowable during processing and harden after a certain period of time; this facilitates production of the parts. The parts can be produced inexpensively; the shape versatility essentially has no limits. However, these parts do not have the required fire resistance.

Moreover, EP 861 216 B1 discloses an inorganic resin composition which is classified according to EN 13501-1 in class A1 as nonflammable. The resin composition which in the following is referred to also as phosphate ceramic is sold under the name VUBONITE® and prior to use is mixed from a solid powder component and a liquid component to a viscous flowable material. This material, similar to organic resins, can be processed in versatile ways wherein some of the generally known disadvantages are avoided. The disclosure of EP 861 216 B1 is explicitly incorporated into the instant application. The resin composition has however a thermal conductivity of 1 W/mK so that, without further measures, the requirements with respect to fire resistance with regard to maximum permissible temperature on the side of the component that is facing away from the fire (when it is produced in normal thickness (thickness of the material) of e.g. 4 mm) cannot be fulfilled.

The first object of the invention is to provide a component of predominantly pourable materials that with a minimal total thickness and thus with a relatively minimal weight can fulfill the requirements with respect to fire resistance at least of class B-15 and, furthermore, is elastic in such a way that deformations occurring at high thermal load do not cause breakage of the component.

The second object resides in providing a method for producing the components.

SUMMARY OF THE INVENTION

The object is solved in that the component is manufactured multi-layered of phosphate ceramic as well as of fibers and in that a layered configuration of the component, on a surface that is facing a potential heat source, comprises at least one layer that is only partially joined with a layer arranged underneath, i.e., a layer that is farther away from the heat source. The component is of a multi-layer configuration comprised of phosphate ceramic as well as of fibers. The phosphate ceramic that is mixed from a solid component and a liquid component in accordance with EP 861 216 B1 is fire-proof, i.e., not very easily inflammable, and pressure-resistant. The fibers that are incorporated into the phosphate ceramic impart to the component additionally an excellent tensile strength so that the component as a whole, even in case of a fire, exhibits a high total stability. The material can be processed in the same way as e.g. glass-fiber reinforced plastic (GFRP) to any shape and can have in this context relatively minimal material thicknesses. It is relatively lightweight and, in comparison to other constructions, can be produced inexpensively.

Moreover, a layer configuration of the component has on its surface that is facing a potential heat source at least one layer that is only partially joined, respectively, with a layer arranged underneath, i.e., a layer that is farther away from the heat source. Under the action of great heat of more than 700 degrees Celsius this layer will detach from the lower one so that a passage is produced that effects an insulation of gas and through which the hot gases can be returned into the area of the fire. In case of a fire, in a targeted fashion a delamination is caused of at least one predetermined layer of the component in order to then improve the thermal insulation significantly. The thermal conductivity of the component is thus greatly reduced in case of a fire. In this way, a temperature of a surface of the component that is facing away from the fire is not impermissibly increased. Fire tests according to the pertinent standards for class B-15 have shown that the temperature on the surface that is facing away with maximally 75 degrees Celsius to 140 degrees Celsius is far below the permissible limit of 225 degrees Celsius.

When more stringent requirements with regard to fire resistance are demanded, several of the layers described in the preceding paragraph are arranged so that in case of a fire several passages are formed. These layers are preferably arranged directly adjacent to each other.

The component, due the simple shaping process, has versatile uses, for example, as a fire protection wall, window frame, partition or cabin module, in particular in the construction of passenger ships.

The dependent claims concern advantageous embodiments of the invention.

In one embodiment of the invention the fibers are in the form of random nonwoven fiber mats of glass-staple fibers. Glass fibers are flame-proof and have a high tensile strength. Random nonwoven fiber mats are available in various qualities on the market and form together with phosphate ceramic an intimate connection so that the component as a whole has a high stability. Bonding of the fibers in the mat is either offered in the form of emulsion bonding or powder bonding which has an effect on the processability and is selected in accordance with the application.

In a further embodiment, the component is of a three-layer configuration wherein a first one of the layers is formed of a first fiber mat that is impregnated with the phosphate ceramic, wherein a second one of the layers is comprised of a second fiber mat that is wetted with the phosphate ceramic, and wherein a third one of the layers is comprised of a plurality of third fiber mats that are impregnated with the phosphate ceramic.

The first and the second layers effect the thermal insulation in case of a fire. The surface of the first layer breaks open and forms in this way a first insulation layer; the second layer detaches partially from the third layer so that between the second layer and the third layer the passages are formed that, on the one hand, comprise a main insulation layer of gas and, on the other hand, enable flowing of gases in the direction of the heat source. The first layer and the second layer adhere to each other and remain substantially in stable form. The third layer forms a supporting structure that is responsible for the stability of the entire component and is not impaired by the action of the heat. The number of the fiber mats that is at least three and thus the thickness of the third layer depends on the required stability and on the required class of fire resistance.

In a further configuration the first fiber mat has a weight per surface area of 200 to 400 g/m$^2$, in particular 200 to 300 g/m$^2$, the second fiber mat of 350 to 550 g/m$^2$, in particular, 400 to 500 g/m$^2$, and the third fiber mat of 350 to 700 g/m$^2$, in particular 400 to 500 g/m$^2$. These qualities have proven to be particularly suitable for the requirements and result in the required stability of the individual layers.

In a further embodiment, the component has in addition to the aforementioned layers a decorative layer whose thickness is up to 1.5 mm and maximally 2 mm. The decorative layer is laminated onto the first layer and accordingly, in case of a fire, positioned on the side that is facing a fire. The decorative layer provides a smooth visible face and can be designed e.g. with commercially available lacquers and or with other materials.

In a further embodiment, the component has channels that have openings that are directed toward the heat source. Like the passages, the channels act as an insulation layer. The channels are either shaped during the production process of the components or are introduced after manufacture e.g. by means of milling.

The second object is solved according to the methods described in the following, wherein the methods differ by a reversal of the order and the changes caused thereby. A first variant is characterized by the following steps in the indicated order:

providing a suitable mold;
mixing a phosphate ceramic from a solid component and a liquid component;
forming a first layer by placing a first fiber mat into the mold and impregnating the first fiber mat with the phosphate ceramic;
applying a second fiber mat onto the wet first layer and wetting the second fiber mat with the phosphate ceramic for forming a second layer;
waiting until the second layer begins to harden;
at the beginning of hardening of the second layer: forming a third layer of a plurality of plies, wherein for each of the plies a third fiber mat is applied and impregnated with the phosphate ceramic;
removing the hardened component from the mold.

First, a suitable mold is provided. The mold corresponds to the configuration of the component to be shaped and can be used several times.

A phosphate ceramic is mixed in a sufficient quantity from a solid component and a liquid component in accordance with the manufacturer's directions.

A first layer of the component is formed. For this purpose, a first fiber mat is appropriately cut to size, introduced into the mold, and impregnated with the phosphate ceramic. Impregnation means that so much of the phosphate ceramic is applied and worked into the fiber mat that it is completely enclosed by the phosphate ceramic; this means that the phosphate ceramic also completely wets the mold.

Then a second fiber mat cut to size is placed onto the first, still wet (not yet hardened) layer and is wetted with the phosphate ceramic for forming a second layer (wet on wet). Wetting in this context means that the second fiber mat is enclosed mostly but not completely by the phosphate ceramic. In particular, the surface that is formed after the production process of the second layer should not be completely smooth.

Subsequently, one was until the second layer begins to harden.

As soon as hardening of the second layer begins, a third layer of a plurality of plies is formed wherein for each one of the plies a third fiber mat is applied and is impregnated with the phosphate ceramic. This means that onto the surface of the second layer that has begun to harden the third fiber mat is placed as a ply and is impregnated with the phosphate ceramic and that then further plies in the same manner are applied onto the wet surface of the ply (wet on wet).

Finally, the component is removed from the mold after hardening.

When processing wet on wet, the way the first layer together with the second layer and the third layer of plies are produced, it is achieved that a quasi monolithic composite is produced that is very stable. This means that this monolithic composite exists, on the one hand, between the first layer and the second layer and, on the other hand, between the plies. Between the second layer and the third layer, on the other hand, because of initial hardening of the second layer before forming the third layer, a targeted substantially weaker connection exists. The latter serves as a nominal breaking point in case of fire so that thermally insulating passages can be formed.

It is possible to work also in reverse order, pursuant to a second variant, wherein the third layer is thus formed first in the mold and subsequently the second layer and the first layer are applied. Before forming the second layer, the third layer must harden in this case. Accordingly, the following steps in the indicated order are carried out:

providing a suitable mold;
mixing a phosphate ceramic from a solid component and a liquid component;
forming a third layer in the mold of a plurality of plies, wherein for each of the plies a third fiber mat is applied and impregnated with the phosphate ceramic;
waiting until the third layer begins to harden;
at the beginning of hardening of the third layer: applying a second fiber mat onto the third layer and wetting the second fiber mat with the phosphate ceramic for forming a second layer;
forming a first layer by applying a first fiber mat and impregnated the first fiber mat with the phosphate ceramic;
removing the hardened component from the mold.

Forming a decorative layer is in principle known in the art. The application of the peel ply has the effect that after its removal the surface is clean and has a defined structure that ensures an excellent bonding with the subsequently applied first layer. Upon working in the reverse order, the peel ply is pressed onto the first layer and is removed after its at least partial hardening.

The invention will be explained in more detail with the aid of an embodiment that is schematically illustrated in the drawing.

BRIEF DESCRIPTION OF THE DRAWING

The only Figure shows schematically, not to scale, the configuration of a component in accordance with the invention in cross-section.

DESCRIPTION OF PREFERRED EMBODIMENTS

As can be seen in the FIGURE, the component 1 of which a section of a cross-section is illustrated is comprised of a plurality of, in this case four, layers 2, 3, 4, 5. In the FIGURE, the layers 2, 3, 4, 5 are, from top to bottom, i.e., in case of a fire from the side that is facing the fire to the side that is facing away from the fire, a decorative layer 2, a first layer 3, a second layer 4, and a third layer 5.

A configuration 6 important for the fire resistance is comprised of the first, the second and the third layers 3, 4, 5 and is comprised of a phosphate ceramic as well as fibers 7, 8, 9. The phosphate ceramic is mixed from a liquid component and a solid component, is viscous after mixing, and cures with release of heat within a certain amount of time; this means, it hardens to a concrete-like material. Before hardening, the phosphate ceramic can be processed in the same way as polyester resin, for example.

The first layer 3 comprises a first fiber mat 7 that is impregnated with the phosphate ceramic. The first fiber mat 7 is a powder-bonded random nonwoven glass fiber mat with a weight per surface area of approximately 225 g/m$^2$.

The second layer 4 comprises a second fiber mat 8 that is wetted with the phosphate ceramic. The second fiber mat 8 is an emulsion-bonded random nonwoven glass fiber mat with a weight per surface area of approximately 450 g/m$^2$.

The first layer 3 and the second layer 4 are combined monolithically by an appropriate production process; this is illustrated in the FIGURE by a dotted separating line.

The third layer 5 comprises a plurality of, here three, third fiber mats 9 which are impregnated layer by layer with the phosphate ceramic. The third fiber mat 8 is a powder-bonded random nonwoven glass fiber mat with a weight per surface area of approximately 450 g/m$^2$. The third layer 5 is monolithic which is indicated in the FIGURE by the dotted separating lines between the layers and has a thickness of approximately 5 mm.

The first layer 3 and the second layer 4 that are monolithically joined are laminated onto the monolithic third layer 5 wherein this lamination is intentionally incomplete. In this way, it is made possible that these two monolithic structures in case of a fire can separate from each other and thereby form passages.

The decorative layer 2 is formed of a fire-resistant polyester resin as well as fibers and is laminated fixedly onto the first layer 3. The decorative layer 2 comprises a layer of gelcoat 10, a layer of fiber nonwoven 11 impregnated with the polyester resin as well as a layer of a fourth fiber mat 12 that is impregnated with the polyester resin. The thickness of the decorative layer 2 is here 1.4 mm.

The layer of gelcoat 10 has a thickness of maximally 600 micrometer. The gelcoat 10 is a known silica-containing polyester resin that can be easily processed, for example, can be ground and lacquered. It has a smooth and dense surface and can be dyed.

The fiber nonwoven 11 is a random nonwoven glass fiber mat of very fine fibers with a weight per surface area of 30 g/m$^2$ and has relatively smooth surfaces. The fiber nonwoven 11 is impregnated with the polyester resin. This layer prevents that fibers of the fourth fiber mat 12 penetrate into the gelcoat 10 and thereby disturb its appearance and/or processibility.

The fourth fiber mat 12 is an emulsion-bonded random nonwoven glass fiber mat with a weight per surface area of 225 g/m$^2$ and is impregnated with the polyester resin.

In case of a fire, the decorative layer 2 separates from the first layer 3.

The component 1 is manufactured preferably by beginning with the layer of gelcoat 10 to the third layer 5; the manufacture can be carried out in reverse order also.

A mold that has been treated with a mold release agent is made available and the fiber mats 7, 8, 9, 12 as well as the fiber nonwoven 11 are cut to size. Shortly before the respective use, the phosphate ceramic of a solid component and a liquid component as well as the gelcoat 10 and the fire-resistant polyester resin are mixed separately with hardening agent.

A thin layer of gelcoat 10 is applied by means of a brush or a spray gun onto the mold. Further processing is discontinued until the gelcoat 10 has cured.

Onto the cured gel coat 10 the cut-to-size nonwoven 11 is applied and by means of a brush is impregnated with the polyester resin. Onto the thus produced surface of the wet, i.e. not yet cured, polyester resin, the fourth fiber mat 12 is applied and also impregnated with the polyester resin. Onto this new surface a so-called peel ply is applied and is pressed on lightly by a roller.

After curing of the polyester resin the peel ply is removed from it. The surface of the polyester resin has now a defined surface structure in accordance with the structure of the peel ply and is clean. Onto this surface, the first fiber mat 7 is applied that is impregnated with the phosphate ceramic and in this way forms the first layer 3. In this impregnation step care is taken that the phosphate ceramic is applied particularly homogeneously without significant air inclusions and worked into the first fiber mat 7 in such a way that the surface of the polyester resin is coated.

Onto the first wet layer 3 the second fiber mat 8 is placed and wetted with the phosphate ceramic and in this way the second layer 4 is formed. In this connection, in contrast to impregnation, the second fiber mat 8 is intention ally incompletely coated with the phosphate ceramic and air inclusions are permitted. A surface of the second layer manufactured in this way comprises thus the fibers as well as the phosphate ceramic and is accordingly rough. A good bonding between the first layer 3 and the second layer 4 is however ensured because the second fiber mat 8 is placed onto the wet phosphate ceramic of the first layer 3 and is then wetted wherein the phosphate ceramic of the second layer 4 flows into that of the first layer 3.

One waits until the phosphate ceramic of the second layer 4 begins to harden.

With the beginning of hardening, the third layer 5 is formed ply by ply. For this purpose, the third fiber mat 9 is placed onto the second layer 4 and is impregnated with the phosphate ceramic; these two processes are repeated until the predetermined number of plies is produced, here twice. In this context, the third fiber mat 9 is applied onto the wet, i.e., not yet hardened phosphate ceramic of the previously manufactured layer. Impregnation is done, for example, by means of a brush or by pouring and subsequent working in and uniform distribution.

One waits until the phosphate ceramic has hardened and then the component 1 is removed from the mold. Optionally, the edges of the component 1 are post-treated.

Upon processing in the reverse order, the third fiber mat 9 is placed onto the mold and is impregnated with the phosphate ceramic. The further plies and thus the third layer 5 are produced.

One waits until the phosphate ceramic begins to harden.

With the beginning of hardening, the second layer 4 is formed. For this purpose, the second fiber mat 8 is placed onto the third layer 5 and wetted with the phosphate ceramic. In this context, care is taken that the phosphate ceramic only partially, i.e., incompletely, penetrates through the second fiber mat 8 to the third layer 5 and rated breaking points are existing in this way for forming the passages in case of a fire.

Onto the wet surface of the second layer 4 the first fiber mat 7 is placed and is impregnated with the phosphate ceramic.

Onto the wet surface of the thus formed first layer 3 the peel ply is placed and lightly pressed on.

One waits with the manufacture of the decorative layer 2 until the first layer 3 has hardened. Then the peel ply is pulled off, the fourth fiber mat 12 is applied and impregnated with polyester resin. Onto the thus formed wet surface the fiber nonwoven 11 is applied and then impregnated with the polyester resin.

After curing of the polyester resin the gelcoat 10 is applied.

When the component 1 is to be produced without decorative layer 2, the corresponding processing steps including application of the peel ply are obsolete.

Should the component 1 be formed as a substantially flat plate, optional channels are worked into the side that is facing the potential source of the fire. The channels are arranged at a predetermined relative spacing to each other and have openings that are facing the source of fire. In this way, the thermal insulation is further improved and in this way the fire resistance is increased. When using the plate, the channels, with the exception of the openings, are covered by another fire-resistant element.

What is claimed is:

1. A fire-resistant component that is of a multi-layered configuration and is comprised of phosphate ceramic and fibers, wherein the multi-layered configuration of the component has a surface that is to be positioned to face a potential heat source, wherein at said surface the multi-layered configuration comprises at least one layer that is joined with a layer arranged underneath, wherein said layer arranged underneath is farther away from the heat source, wherein said at least one layer and said layer arranged underneath are resting flat on each other across their surface areas and are incompletely joined with each other by an incomplete lamination that is weaker than a lamination between other layers of the multi-layer configuration such that, in case of a fire and exposure to heat, said at least one layer and said layer arranged underneath delaminate so that passages are formed between said at least one layer and said layer arranged underneath.

2. The component according to claim 1, wherein the fibers are glass-staple fibers arranged in the form of random nonwoven fiber mats.

3. The component according to claim 1, wherein the multi-layered configuration is a three-layer configuration of a first, a second and a third layer, wherein said at least one layer at said surface includes said first layer and said second layer, wherein said first layer is formed of a first fiber mat that is impregnated with the phosphate ceramic and said second layer is formed of a second fiber mat that is wetted with the phosphates ceramic, and wherein said layer arranged underneath is said third layer formed of a plurality of third fiber mats that are impregnated with the phosphate ceramic.

4. The component according to claim 3, wherein the first fiber mat has a weight per surface area of 200 to 400 $g/m^2$, the second fiber mat has a weight per surface area of 350 to 550 $g/m^2$, and the third fiber mat has a weight per surface area of 350 to 700 $g/m^2$.

5. The component according to claim 1, further comprising a decorative layer.

6. The component according to claim 1, further comprising channels that have openings directed toward the heat source.

* * * * *